United States Patent [19]

Kanzleiter et al.

[11] Patent Number: 4,749,497

[45] Date of Patent: Jun. 7, 1988

[54] METHOD AND APPARATUS FOR TREATMENT OF ACIDIC WATER

[75] Inventors: Richard S. Kanzleiter; Thomas G. Simonetti, both of McMurray; Kenneth E. Ball, Pittsburgh; Sanford M. Stevenson, McMurray, all of Pa.

[73] Assignee: Chemical Separation Technology, Inc., Pittsburgh, Pa.

[21] Appl. No.: 83,525

[22] Filed: Aug. 7, 1987

Related U.S. Application Data

[63] Continuation of Ser. No. 820,955, Jan. 21, 1986, abandoned.

[51] Int. Cl.⁴ .................... C02F 1/52; C02F 1/66
[52] U.S. Cl. ........................ 210/721; 210/724; 210/738; 210/747; 210/170; 210/208; 210/219; 210/220; 210/241
[58] Field of Search ............... 210/709, 721, 722, 724, 210/738, 758, 747, 170, 205, 208, 219, 220, 241, 907

[56] References Cited

U.S. PATENT DOCUMENTS

| | | | |
|---|---|---|---|
| 1,310,383 | 7/1919 | Auld et al. | 252/191 |
| 1,364,387 | 1/1921 | Landreth | 210/721 |
| 2,126,164 | 8/1938 | Anderson | 210/758 |
| 2,897,150 | 7/1959 | Bencowitz | 210/758 |
| 3,210,053 | 10/1965 | Boester | 210/208 |
| 3,541,008 | 11/1970 | Spinola | 210/721 |
| 3,584,840 | 6/1971 | Fuchs | 259/23 |
| 3,680,698 | 8/1972 | Liu | 210/907 |
| 3,715,308 | 2/1973 | Sulfaro | 210/758 |
| 3,920,552 | 11/1975 | Elkern | 210/141 |
| 4,021,348 | 5/1977 | Smith | 210/208 |
| 4,219,418 | 8/1980 | Pilon | 210/721 |
| 4,267,052 | 5/1981 | Chang | 210/208 |
| 4,320,012 | 3/1982 | Palm | 210/724 |
| 4,332,687 | 6/1982 | Daignault | 210/721 |
| 4,351,720 | 7/1982 | Bailes | 210/101 |
| 4,526,687 | 7/1985 | Nugent | 219/298 |
| 4,536,286 | 8/1985 | Nugent | 210/208 |

OTHER PUBLICATIONS

McMillan "pH Titration Curves—Trick or Treat?" InTech pp. 43-47(Oct. 1986).

Primary Examiner—Ernest G. Therkorn
Attorney, Agent, or Firm—Arnold G. Silverman; Joyce L. Morrison

[57] ABSTRACT

A method and apparatus for treating acidic water, such as mine acid water is provided. The apparatus is readily portable and comprises a reaction vessel having an aerator motor operatively associated therewith. Water to be treated is received within said reaction vessel and is treated by having a neutralizing agent and oxidant by way of the aerator motor introduced simultaneously into the system. Because of instantaneous elevation of pH resulting from the simultaneous introduction of oxidant and the neutralizing agent, the reaction time is greatly reduced and the equipment required is small, compact and easily transported.

9 Claims, 2 Drawing Sheets

METHOD AND APPARATUS FOR TREATMENT OF ACIDIC WATER

This is a continuation of application Ser. No. 820,955, filed Jan. 21, 1986 and now abandoned. cl BACKGROUND OF THE INVENTION 1. Field of the Invention This invention relates to a method and apparatus for treatment of acidic water and more specifically it relates to water treatment of mine drainage.

2. Description of the Prior Art

Concern for the quality of natural water has grown in recent years. Acidic and metal-bearing discharges from mineral mining and processing, for example, has resulted in significant degradation of the quality of receiving streams and rivers. Lightly buffered waters in natural drainage systems have become acidic and have been depleted of disolved oxygen, which causes the waters to be uninhabitable by most aquatic life forms.

Conventional mine acid treatment involves (a) neutralization, (b) aeration, (c) settling and disposal of sludge, and (d) effluent discharge. The conventional methods often involve long contact times for treatment chemistries to be effective. Furthermore, known methods involve large machinery which is not easily transportable. For example, U.S. Pat. No. 1,310,383 discloses a process for treatment of acid drainage water from mines. The disclosure involves a process whereby acid mine water is collected. The water is neutralized and the neutrailized water is agitated and aerated, thus precipitating the resultant sludge.

U.S. Pat. No. 3,920,552 discloses a self-contained water treatment unit. This unit is retained on a large truck. The water is removed from a lake or stream and treated on the truck, then redeposited into the source.

U.S. Pat. No. 4,351,720 discloses a water treating apparatus. The apparatus is placed directly in a stream and has outwardly extending walls for receiving the water into the unit, which is treated therein.

Small operators with limited budgets are unable to provide the necessary complex water treatment facilities, such as discussed above. Therefore, the polluted water often goes untreated.

There remains a need for an improved apparatus and method for treating acid water, including mine acid water, which is portable and lower in cost than what has been known previously. There remains a need for such a device which is adapted to be used in any type of water surce and which may be easily transportable. There remains a need for a method and apparatus that simultaneously provide aeration and neutralization of the water. There also remains a need for enhanced efficiency of water treatment units which minimize power consumption requirements and which thus lend themselves to remote and low-cost operation.

SUMMARY OF THE INVENTION

The present invention has produced a solution to the above-described need by providing a method and apparatus for treating acidic water. The apparatus is readily adaptable to provide the necessary equipment to treat acidic, metal-bearing water by means of an easily transportable package. The enhance efficiency of the unit minimizes power consumption requirements and lends itself to remote and low-cost operation.

The invention provides an apparatus and method of water treatment for the purpose of precipitating metals and neutralization of acid found in waters such as that which results from mine drainage. The apparatus of the invention is adapted to be a portable water treatment facility having the capability to introduce chemicals and gases into influent water. Treated water is discharged into a settling basin or thickener to allow settling of metal oxides and hydroxides. This produces a decanted water suitable for discharge.

More particularly, the apparatus, in a preferred form, consists of a skid, a cylindrical reaction vessel, a series of baffles within the reaction vessel, pH monitoring means, and piping to facilitate the contact of air, water and the necessary chemicals. Exterior to the tank are the aeration motor, metering pump, control panels, and other necessary parts. The method involves connecting the water treatment means to the water process stream. A source of power may be preferably incorporated into the unit. Also, a source of the necessary chemicals may also be incorporated into the unit.

An object of the present invention is to provide a readily transportable water treatment unit which effectively introduces chemicals and gases into influent water in order to oxidize metals and remove them through precipitation, to neutralize acid contained in the water, and further to introduce oxidants into the water.

It is a further object of the invention to maximize treatment of the water by introducing the neutralizing agent and the oxidant at the same point into the water system simultaneously.

It is yet a further object of the invention to provide an apparatus and associated method for treating water which utilizes a low power input and which provides water treatment at a low cost.

It is a further object of the invention to provide a neutralization means in generally close proximity to the aeration means, such that the introduction of the neutralization agent into the process stream is at about the same location as the introduction of the air, gases and/or oxidants.

It is yet a further object of the invention to provide a method for treating mine acid in a way which reduces the reaction time necessary for neutralization and oxidation of metals.

It is a further object of the present invention to provide an apparatus which is readily movable, requires no operator and makes optimum use of power and chemicals.

A further object is to provide a treatment apparatus which requires little maintenance.

These and other objects of the invention will be fully understood from the following description of the invention with reference to the illustrations appended hereto.

DESCRIPTION OF THE PREFERRED EMBODIMENT

The present invention provides a method and apparatus for treating acid water such as mine acid water. The apparatus preferably consists of a reaction vessel having a series of baffles therein, a pH monitoring probe and an erator motor mounted on a skid and having the necessary piping connecting the aforementioned equipment. The apparatus is connected to a source of the raw water, such as a stream. The power source which may be, for example, a portable generator or line power, is connected to the apparatus to energize the system. A caustic substance is injected into the system which neutralizes the acid in the water. At generally the same point, an aerator introduces oxidant into the influent flow stream. The neutralization means and aeration means are in generally close proximity and oriented in generally the same axial position. The flow stream experiences substantially instantaneous elevation of pH and the oxidation rate required for treatment is thereby greatly accelerated. This eliminates the need for long contact times for treatment chemistries to occur.

Figure 1:
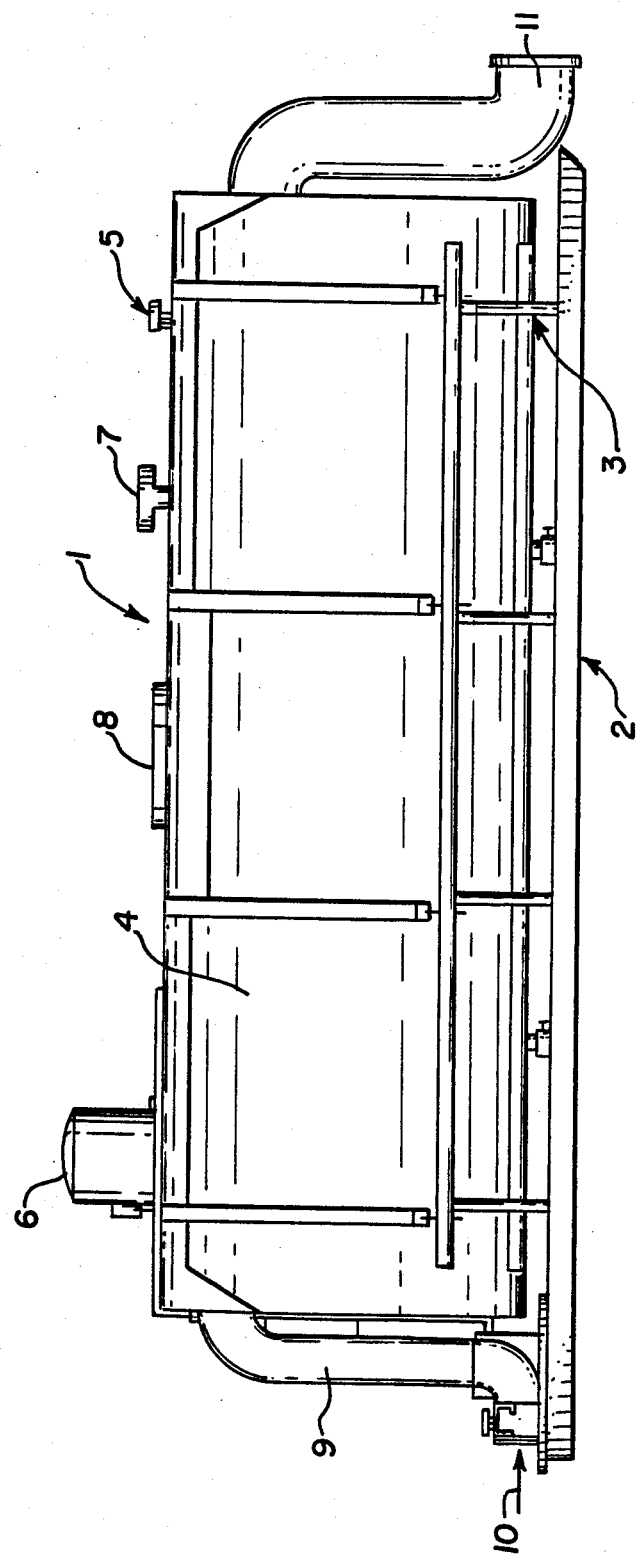
FIG. 1 is a front elevation of the apparatus of the present invention.

Referring to FIG. 1, portable mine acidic treatment apparatus 1 is shown. The treatment unit 1 is preferably mounted on a skid 2 by suitable mounting means 3. The unit comprises cylindrical reaction vessel 4 having a plurality of baffles disposed therein (not shown). Reaction vessel 4 has pH monitoring probe 5 mounted thereon. This probe may be any suitable standard industrial quality pH probe. Aerator motor 6 is also mounted on reaction vessel 4. Reaction vessel 4 has air vent 7 and manway 8 on the top portion thereof.

Influent conduit 9 receives water from a source indicated by the arrow 10. Effluent conduit 11 discharges the treated water.

Figure 2:
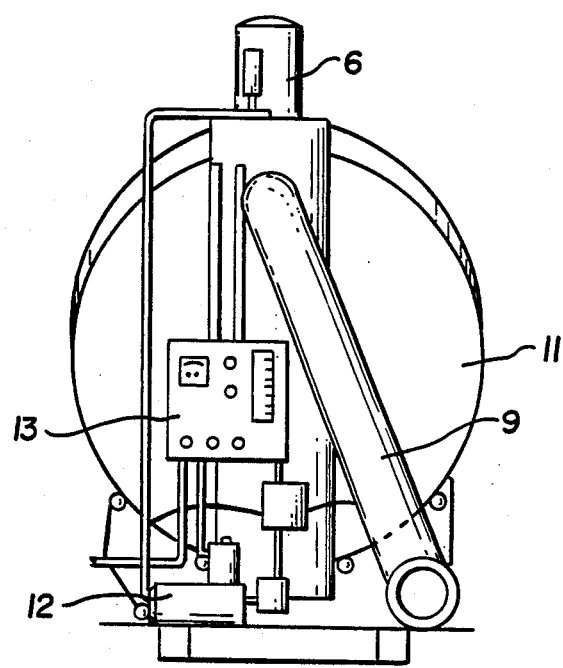
FIG. 2 is a side elevation of the apparatus of the present invention.

FIG. 2 shows metering pump 12, which is used to control the amount of fluid introduced into the system. Control panel 13 is used to monitor flow of fluids into the system. For example, a 1 GPM metering pump will treat 360 GMP of fluid containing 300 ppm iron using a 20% sodium hydroxide solution. The metering pump through a pH monitoring device maintains a proper pH level for the effluent.

Figure 3:
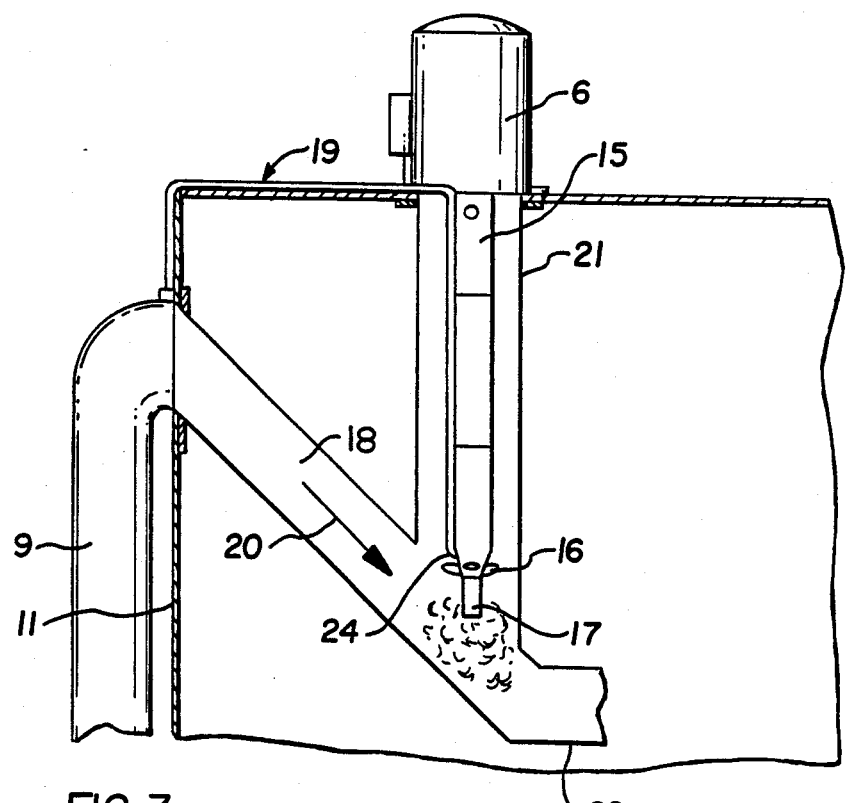
FIG. 3 is a sectional view of a part of the present invention showing the aerator motor and the point where oxidant and the neutralizing agent are simultaneously introduced into the system.

The method of treating the water may be considered in connection with the apparatus shown schematically in FIG. 3. Influent water to be treated is received through influent pipe 9 and is transferred into reaction vessel 4 by way of conduit. The direction of flow is shown by arrow 20. Conduit 21 contains aerator shaft 15, which extends from aerator motor 6. Caustic feed line 19 extends along reaction vessel 4 in generally the same axial position and further in juxtaposition to aerator shaft 15, as shown in FIG. 3. Caustic feed line 19 connects caustic supply means (not shown) to the reaction vessel 4. The air flows through aerator shaft 15 and is agitated with aerator prop 16 at diffuser 17. At generally the same point, the neutralizing agent is received through caustic feed line 19 and enters the system just above aerator prop 16. At this point, the water to be treated represented by flow arrow 20 meets the oxidation and the neutralization agents, as shown at the point where diffuser 17 emits the oxidant.

The tank is constructed to allow for aeration and neutralization to take place at generally the same point in the process flow. In this way, the flow stream experiences instantaneous elevation of pH and the oxidation rate required for water treatment is greatly accelerated. After mixing of the oxidant, the caustic agent and the water to be treated, conduit 22 sends the mixture to an area of the tank that may contain internal baffles (not shown).

Internal baffles allow for mixing, turbulence increasing and extended contact time. The baffles insure that the treatment reactions are complete prior to discharge from the reaction vessel. The baffles are preferably elongated planar sheets spaced equidistantly throughout the tank. They may be the full height of the tank or only a portion of the height of the tank. The size of the openings and the location is dependent upon the fluid being processed. For example, in a 1,000 gallon tank two baffles may be placed an equal distance from each other and from the walls of the tank. The baffles may be stationary fiberglass perforated plates spaced evenly in the tank. The number of baffles, the height of the baffles inside the tank and the size of the openings are dependent upon the type of fluid flow that is contemplated for the system.

In operation, the device receives water to be treated 10 through influent pipe 9. The water is received generally in reaction vessel 4. The water is thus received into conduit 18 and is sent to the point of mix. Aerator motor 6 creates a flow of air (oxygen) through aerator shaft 15. Simultaneously, a neutralizing agent, such as sodium hydroxide, potassium hydroxide, and mixtures thereof, is sent through caustic feed line 19. The air is discharged at diffuser 17 and the neutralizing agent is discharged at the end 24 of caustic feed line 19. Aerator prop 16 agitates the surrounding fluid and the neutralizing agent, and the gas and the water to be treated are thereby mixed. As stated hereinbefore, the flow stream thus experiences sudden elevation of pH which greatly accelerates the oxidation rate required for treatment. The resulting fluid is sent to a detention structure for clarification of the treated effluents. The treated water can be discharged to a settling structure for solids removal. At this point, the settlement of sludge occurs.

The simultaneous introduction of the air, water and the chemical in a regulated manner accelerates the reaction time. Beacuse of this instantaneous reaction time, large bulk mixing and reaction chambers are not needed. Through the use of precision metering and control equipment, the process disclosed is self-regulating, compact, easily transportable, and can operate on a number of different power sources such as a portable generator or line power.

The unit can be readily transported, requires no operator, makes optimum use of power and chemicals, and requires little maintenance. In addition, the possibility exists that ozone, alone or with different reagents such as hydrogen peroxide, can be combined in the same manner to expand the environment in which this invention may be used. That is, other environments and other types of chemicals for treating various types of pollution are contemplated as within the scope of the claimed invention.

Whereas particular embodiments of the invention have been described above, for purposes of illustration, it would be evident to those skilled in the art that numerous variations of the details may be made without departing from the invention as defined in the appended claims.

I claim:

1. A water treatment appartus comprising,
a reaction vessel,
a source of acidic or metal-bearing water,
influent pipe means operatively connected to said reaction vessel for delivering said water to be treated from said water source to said reaction vessel, aerator means having a shaft extending therefrom into said reaction vessel said shaft having a discharge end for discharging oxidant, said aerator means having agitation means, said influent pipe means disposed generally adjacent to the discharge end of said aerator shaft, a neutralizing agent feed line means leading from neutralizing supply means into said reaction vessel for delivering neutralizing agent, said neutralization feed line means operatively associated with said aerator shaft such that a discharge end of said neutralizing agent feed line is positioned generally adjacent to said agitation means, pump means operatively associated with said reaction vessel, power source means operatively associated with said reaction vessel for energizing said apparatus, effluent discharge pipe means operatively connected to said reaction vessel for discharging the water, and automated metering and control means for delivering said neutralizing agent into said reaction vessel through said neutralizing agent feed line means and oxidant from said aerator means at substantially the same time, whereby said oxidant impinging upon the water entering said reaction vessel will aerate said water and establish mixing therein so as to enhance efficiency of distribution of said neutralizing agent in said water to reduce reaction time and enhance efficiency of said reaction.

2. The apparatus of claim 1, wherein said influent pipe is disposed closely adjacent to the discharge end of said aeration shaft, whereby the relative general proximity of said water source means, said neutralizing agent, feed line discharge end, and said agitation means will enhance the efficiency of the reation.

3. A method of treating acidic water comprising, providing a treatment unit comprising aerator means, said aerator means having a shaft extending therefrom into said treatment unit and said aerator means having agitation means, influent pipe means disposed generally adjacent to the discharge end of said aerator shaft and neutralizing agent feed line means disposed generally adjacent to the exit of said aerator means, providing means for introducing a source of acidic or metal-bearing water into a treatment unit, introducing said water to be treated into said treatment unit, introducing a neutralizing agent into said treatment unit, introducing oxidant at generally the same point at which said neutralizing agent is introduced into the water to be treated, agitating said water, oxidant, and neutralizing agent, providing a means for receiving precipitants from said mixture, and discharging treated water from said treatment unit.

4. The method of claim 3, wherein said primary oxidant source is air.

5. The method of claim 3, wherein the neutralizing agent and the oxidant are substantially simultaneously introduced into said water.

6. The method of claim 3 wherein said method is employed in treating mine acid water.

7. The method of claim 3 wherein prior to treatment, said water is removed from a stream and introduced into said treatment unit; and after treatment said treated water is discharged into a settling structure for solids removal.

8. The method of claim 3 wherein prior to treatment, said water is removed from a stream and introduced into said treatment unit; and after treatment said treated water is discharged into a settling structure then into said stream.

9. The method of claim 3 wherein the pH is substantially instantaneously elevated.

* * * * *

UNITED STATES PATENT AND TRADEMARK OFFICE
CERTIFICATE OF CORRECTION

PATENT NO. : 4,749,497

DATED : June 7, 1988

INVENTOR(S) : R.S. KANZLEITER, T.G. SIMONETTI, K.E. BALL, S.M. STEVENSON

It is certified that error appears in the above-identified patent and that said Letters Patent is hereby corrected as shown below:

Column 1, lines 6-7, "cl" should be deleted and "BACKGROUND OF THE INVENTION" should be centered on line 7.

Column 1, line 64, "enhance" should be --enhanced--.

Column 3, line 3, "erator" should be --aerator--.

Column 4, line 38, "Beacuse" should be --Because--.

Claim 2, column 5, line 36, "reation" should be --reaction--.

Signed and Sealed this

Twenty-seventh Day of December, 1988

Attest:

DONALD J. QUIGG

*Attesting Officer*  *Commissioner of Patents and Trademarks*